United States Patent [19]
Benveniste

[11] Patent Number: 6,112,092
[45] Date of Patent: *Aug. 29, 2000

[54] SELF-CONFIGURABLE CHANNEL ASSIGNMENT SYSTEM AND METHOD

[75] Inventor: Mathilde Benveniste, South Orange, N.J.

[73] Assignee: Lucent Technologies Inc., Murray Hill, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/634,713

[22] Filed: Apr. 18, 1996

[51] Int. Cl.$^7$ ..................................................... H04Q 7/20
[52] U.S. Cl. ............................... 455/450; 455/62; 455/63
[58] Field of Search .................................... 455/447, 450, 455/451, 452, 453, 455, 509, 516, 63

[56] References Cited

U.S. PATENT DOCUMENTS

| | | |
|---|---|---|
| 5,148,548 | 9/1992 | Meche et al. . |
| 5,212,831 | 5/1993 | Chuang et al. .......................... 455/450 |
| 5,448,750 | 9/1995 | Eriksson et al. . |
| 5,448,751 | 9/1995 | Takenaka et al. ....................... 455/450 |
| 5,475,868 | 12/1995 | Duque-Aton et al. . |
| 5,497,503 | 3/1996 | Rydberg et al. ........................... 455/63 |
| 5,504,939 | 4/1996 | Mayrand et al. ........................ 455/450 |
| 5,513,379 | 4/1996 | Benveniste et al. ..................... 455/451 |
| 5,577,071 | 11/1996 | Gehrke et al. ........................... 375/259 |

FOREIGN PATENT DOCUMENTS 0490554  6/1992  European Pat. Off. .

OTHER PUBLICATIONS

J. Avery & J. Yamada, "A Common Air interface for a Cellular Auxiliary Personal Communication Service," Proceedings of the 5th IEEE International Symposium . . . pp. 665–669, Dec. 1994.

*Primary Examiner*—Reinhard J. Eisenzopf
*Assistant Examiner*—Sam Bhattacharya
*Attorney, Agent, or Firm*—Gibbons, Del Deo, Dolan, Griffinger & Vecchione

[57] ABSTRACT

A self-configurable wireless system is provided which can determine its own channel assignments without the need for advance planning or human intervention. Such a system is implemented as an improvement to a wireless communications network having service areas partitioned into a plurality of cells, that improvement being implemented through a cooperative combination of: (1) a means for autonomously collecting data at the cells in respect to serving signal/interference measurements and other relevant data; and (2) a means for automatically carrying out a selected channel assignment algorithm in response to data provided by the data collecting means.

21 Claims, 8 Drawing Sheets

SELF-CONFIGURABLE CHANNEL ASSIGNMENT SYSTEM AND METHOD

CROSS REFERENCE TO RELATED APPLICATIONS

This application is related to U.S. patent application Ser. No. 08/634,320, entitled "Adaptive-Dynamic Channel Assignment Organization System and Method", (M. BENVENISTE-6), and U.S. patent application Ser. No. 08/401,387, filed Mar. 9, 1995, entitled "Apparatus and Method For Adaptive Dynamic Channel Assignment In Wireless Communication Networks", (M. BENVENISTE-5), said first-named related application being concurrently filed with the present application, both said related applications having the same inventor, and both being incorporated herein by reference.

BACKGROUND OF THE INVENTION

A. Field of the Invention

This invention relates to wireless/cellular radiotelephone systems and more particularly to an apparatus and method for realizing a self-configurable allocation of radio frequency (RF) spectrum channels to the different cells within a cellular system.

B. Background Art

The service area of a wireless communications system is partitioned into connected service domains known as cells, where radio telephone users communicate, via radio links, with the base station serving the cell. The base station (BS) is coupled to the land network. Efficient use of the available radio frequency spectrum is achieved through the reuse of the same radio frequencies in designated co-user cells that are sufficiently separated by distance so that the combined interference generated by co-channel and neighbor-channel cells is below tolerable levels.

Historically, the assignment of radio frequencies (or channels) to cells has been based on regularity assumptions (i.e., equal-sized regularly-spaced cells with uniformly distributed traffic loads), which enable the adoption of simple rules for identifying co-user cells, and for partitioning the RF spectrum into channel sets. However, because such regularity assumptions often do not hold, and thus the rules of regular channel assignment do not lead necessarily to the efficient utilization of the RF spectrum, a channel assignment approach, known as non-regular channel assignment, has evolved for to address this deficiency. Both regular and non-regular channel assignment approaches can be classified as fixed channel assignment, which is characterized by a fixed relationship between cells and the channels serving them.

In contrast to fixed channel assignment methods, a new classification has been developed known as flexible channel assignment. Such flexible channel assignment methods, exploit the capability of a system for remote, software-driven, retuning of the base station radios, which capability enables channel capacity to adapt to traffic variation.

Wireless systems are generally migrating toward digital technologies from traditional analog wireless systems, although it is expected that analog systems will continue to serve a significant population of users for some time yet. In the digital environment, three candidates are emerging: Time-Division Multiple Access ("TDMA"), Global System for Mobile (GSM), and Code-Division Multiple Access ("CDMA"). The first two involve narrow-band channels that can carry, in separate time slots, three or eight conversations each, respectively. The latter uses wider channels that accommodate many users at once and can be re-used in abutting cells. From a service provider's perspective, one of the fundamental differences between the two technologies is the need for channel assignment in the former, a requirement that is absent in the latter. As will be apparent from the preceding discussion, channel assignment is very much a requirement for the analog systems used today.

The channel assignment function, as carried out in the prior art, is characterized by both the need for advanced planning of such channel assignments and a requirement for considerable data gathering. Additionally, such traditional channel assignment planning tends to achieve sub-optimal traffic loading in the cell of a wireless system, as well as sub-optimal traffic throughput in such a system.

SUMMARY OF INVENTION

Accordingly, an object of the invention is the provision of a self-configurable wireless system which can determine its own channel assignments without the need for advance planning or human intervention.

That object is realized as an improvement to a wireless communications network having service areas partitioned into a plurality of cells, that improvement being implemented through a cooperative combination of:

- a means for autonomously collecting data at the cells in respect to serving signal/interference measurements and other relevant data; and
- a means for automatically carrying out a selected channel assignment algorithm in response to data provided by the data collecting means.

DETAILED DESCRIPTION

Figure 1:
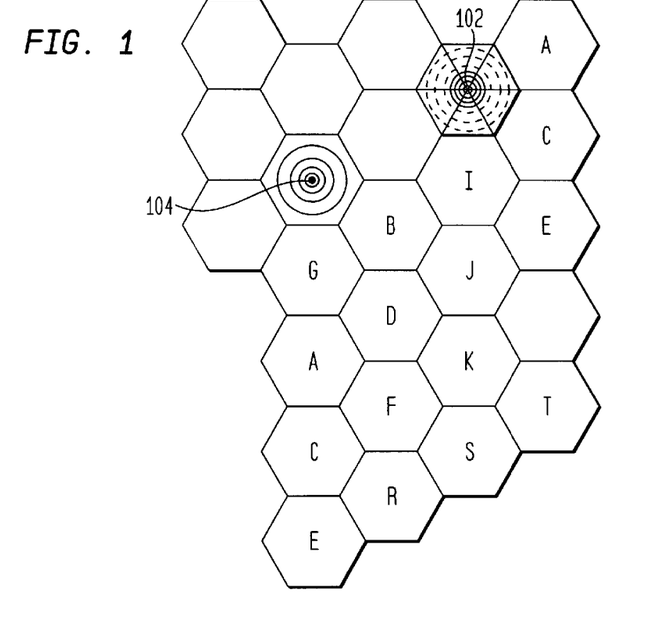
FIG. 1 is a schematic of a regular cell area layout of a wireless/cellular radiotelephone system.

A conventional regular hexagonal cell layout of a wireless cellular communications system is shown in schematic form in FIG. 1. Depicting the geographical service area in terms of a hexagonal grid establishes a geometric pattern that permits frequencies to be assigned in a patterned disposition allowing the reuse of those frequencies in a controlled repeatable regular assignment model. The cell areas each have specific channel sets assigned to them. Each channel set comprises a plurality of individual transmit and receive radio channels for use within the cell area. In the model shown in FIG. 1, cells marked "A" are co-user cells and all use the same channel set. The same is true for co-user cells marked "B", "C" etc., each of which has its own assigned channel set.

Each cell is radiated by an antenna system associated with a base station, which base stations may be interconnected with each other and/or with other networks. In the exemplary configuration illustrated in FIG. 1, an omni-directional radiation pattern is depicted by antenna 101 and a directional antenna pattern, representing sectorization of cells into smaller wedge type service areas, is represented by antenna 102.

It is well known that a central aspect of cellular communications systems is the concept of frequency reuse. With frequency reuse, users in different geographical locations (different cells) may simultaneously use the same frequency channel, as depicted by commonly named cells in FIG. 1 for regular channel assignment. While frequency reuse can substantially increase spectral efficiency of a system, serious interference can occur between cells involved in the common use of the same channel in the absence of proper system design. Frequency reuse assignments are generally implemented through the adoption of simple rules for identifying co-user cells and for partitioning the RF spectrum into channel sets.

Channel assignment approaches can be broadly classified into two categories: fixed and flexible. Fixed channel assignment fixes the relationship between cells and the channels serving them. Only the channels allocated to a cell can serve calls in that cell, and each channel can be used simultaneously by all the cells to which the channel is assigned. An example of fixed channel assignment is regular channel assignment, which is characterized by the regular repetition of a reuse pattern. Regular channel assignment is optimal for a system with traffic distributed uniformly across cells.

When the traffic distribution is not uniform, an optimal fixed non-regular channel allocation can be found, which allocates channels to cells according to their traffic load. [A process for achieving such an optimal non-regular allocation is described in M. Benveniste, "Apparatus and Method for Non-Regular Channel Assignment in Wireless Communication Networks", U.S. Pat. No. 5,404,574.]

Flexible channel assignment methods, on the other hand, exploit the capability of a system for remote, software-driven, retuning of the base station radios, which capability enables channel capacity to adapt to traffic variation.

It is also well known that the quality of communication in wireless systems depends substantially on the ratio of the received signal to interference (S/I) or the bit-error-rate (BER), which depends, in turn, on the signal and interference received. The primary interference of concern consists of two components: co-channel interference and neighbor-channel interference. Co-channel interference is the interference from communication sources tuned to the same frequency as the operating channel. Neighbor-channel interference comes from communication sources using channels near the operating channel in the frequency spectrum. To achieve the desired voice or data transmission quality, the ratio of the received signal over the combined co-channel and neighbor-channel interference must be above a specified threshold.

Hereafter, a methodology is described whereby a channelized wireless system, can avoid the need for channel assignment planning, instead making its own channel assignment determinations without the need for advance planning or human intervention. The implementation of that methodology is characterized herein as a self-configurable wireless system. In this self-configurable wireless system, RF planning is reduced simply to the problem of selecting cell sites, and setting system configuration parameters. Everything else that has traditionally been part of RF planning when setting up a new system and expanding it will be guided by software that resides within the system equipment.

I. Introduction

A self-configurable wireless system according to the invention offers two major advantages over prior art systems. Most obvious is the elimination of the channel planning process itself, and, thus, the elimination, or substantial reduction of the expert staff needed for that purpose—a significant cost benefit for the system operator. Second, the number of cell sites needed to serve a given traffic load can be significantly decreased. There are two mechanisms by which such a cell site reduction is achieved. One is through the system's ability to move channels where needed, as traffic loads vary in time. If traffic peaks shift across the system, the portability of channel capacity translates into fewer cell sites. The second is through increased traffic throughput, which is attainable even in static traffic conditions.

Self-configurability encompasses two key features:
Autonomous data collection, and
A selected channel assignment methodology.

The first feature, autonomous data collection, pertains to the data needed for the administration of voice channels. It involves data characterizing the interference environment, and other data relevant to the specific channel assignment algorithm implemented. In the preferred embodiment, using an ADCA algorithm, such data will be the traffic load experienced in a cell. The interference data would be collected upon start-up of the system or after the addition of new cells or sectors. Both types of data can be collected during normal operation and without impact on the system's performance. Appropriate methods for such autonomous data collection will be known to those skilled in the art.

In a preferred embodiment of the invention, the selected channel assignment method is chosen from the class of flexible channel assignment methods, which, as already noted, exploit the capability of a system for remote, software-driven, retuning of the base station radios—that capability enabling channel capacity to adapt to traffic variation. It should be understood, however, that the methodology of the invention is also applicable to fixed channel assignment methods.

Flexible channel assignment methodologies comprise three categories: adaptive, dynamic, and adaptive-dynamic channel assignment, the last category being disclosed and described in the cross-referenced application designated M. Benveniste-6. A channel assignment algorithm of the adaptive-dynamic channel assignment (ADCA) category is identified herein for operation in a preferred embodiment of the self configurability methodology of the invention. That algorithm performs consistently better than the traditional channel assignment methods, and is compatible with current and planned cellular technology, infrastructure, and air-interface standards.

It is to be noted that the self configurability methodology of the invention, as well as the underlying channel assignment method, is applicable to analog, TDMA, GSM, TDMA-analog hybrid systems and GSM-analog hybrid systems. TDMA channels can be treated just like analog channels, so long as one allows three calls per TDMA channel (one on each of three time slots) and all three time slots are used by the same cell/sector. GSM channels will be treated similarly, recognizing that each channel has eight call slots.

II. Channel Assignment

As noted above, for the preferred embodiment of the invention, the channel assignment method is selected from the class of flexible channel assignment methodologies, which class includes the particular categories: adaptive, dynamic, and adaptive-dynamic. Herein, a brief discussion is provided as to those flexible channel assignment categories.

A. Adaptive Channel Assignment

An adaptive channel assignment ("ACA") algorithm adjusts channel assignments to traffic by recomputing the optimal non-regular channel allocation for different time periods, using observed data to estimate expected traffic loads. [See, M. Benveniste, "An Optimization Model for Non-Regular Assignment in Wireless Communications Networks", *AT&T Bell Laboratories Technical Memorandum* 54452-920601-01*TM*, Jun. 1, 1992] With ACA, a new channel allocation is recomputed when the traffic loads have changed in a statistically significant way to warrant recalculation. The time interval between successive channel re-allocations could range from half an hour to eight hours. Re-allocation will be triggered by a test that is equivalent to the rejection of the appropriate test of hypothesis. It provides the mechanism for adjusting to traffic trend variations. Adaptive channel assignment has no way of adjusting to traffic variations due to randomness.

The relationship between channels and cells is fixed within the time interval between consecutive channel re-allocations, much like in non-regular channel assignment.

B. Dynamic Channel Assignment

Another method for adjusting to the variable demand for channels is dynamic channel assignment. Dynamic channel assignment dispenses altogether with the fixed relationship between channels and cells. More users may access a channel than would be possible to serve simultaneously. [See, e.g., L. G. Anderson, "A Simulation Study of Some Dynamic Channel Assignment Algorithms in a High Capacity Mobile Telecommunications System", *IEE Trans. Commun.*, Vol. 21, No. 11, November 1973; R. Beck and H. Panzer, "Strategies for Handover and Dynamic Channel Allocation in Micro-Cellular Mobile Radio Systems", *Proc. IEEE Vehicular Technol. Conference*, May 1989; L. J. Cimini, Jr., G. J. Foschini, and C. -L. I, "Call Blocking Performance of Distributed Algorithms for Dynamic Channel Allocation in Microcells", *AT&T Bell Laboratories Technical Memorandum* 11344-911003-10*TM*, Oct. 3, 1991.] Because of its increased flexibility, a dynamic channel assignment algorithm can adjust to both randomly-induced variations in traffic and to trend changes.

With more users having access to a given channel, the channel's idle time can often be reduced. As is known to those skilled in the art, however, all dynamic channel assignment algorithms do not guarantee a capacity improvement relative to regular channel assignment. [See, e.g., Beck and Panzer, "Strategies for Handover and Dynamic Channel Allocation in Micro-Cellular Mobile Radio Systems" id.] Because the collection of users assigned a channel at a given point in time depends on the dynamics of call arrivals and terminations, the average distance between them may be greater than the minimum separation allowed for interference control reasons. The decrease in capacity, caused by a greater re-use distance, would cancel the potential gains arising from the greater flexibility in channel use.

C. Adaptive-Dynamic Channel Assignment

Adaptive channel assignment outperforms regular channel assignment consistently, but it cannot take advantage of channel idle-time reduction, achieved when the restrictions on channel access are relaxed. Dynamic channel assignment, on the other hand, allows flexibility on the use of channels by different cells, but capacity losses may result at congestion because of the longer average re-use distance realized. Adaptive-Dynamic Channel Assignment ("ADCA") combines the best of the two approaches: the consistent non-inferiority of adaptive channel assignment with the ability of dynamic channel assignment to reduce channel idle time.

ADCA is adaptive channel assignment using a special form of dynamic channel assignment, channel borrowing. In traditional channel borrowing, channels are allocated to cells by the rules of regular channel assignment. [See, Anderson, "A Simulation Study of Some Dynamic Channel Assignment Algorithms in a High Capacity Mobile Telecommunications System", id.; J. S. Engel and M. M. Peritsky, "Statistically-Optimum Dynamic Server Assignment in Systems with Interfering Servers", *IEEE Trans. Commun.*, Vol. 21, No. 11, November 1973.] Cells will attempt to use the allocated channels first. If unavailable, other channels will be accessed. A channel that is used by a cell other than its owner cell will be referred to as a borrowed channel. A channel will be used by a cell only if interference restrictions are satisfied.

The channel borrowing algorithm in ADCA differs from traditional channel borrowing in that the channel allocation is not regular. It is non-regular, just as in adaptive channel assignment. Because of channel borrowing, ADCA can adjust channel capacity to randomly-induced variations in traffic, as well as to traffic trend changes.

An illustration of this ADCA approach is presented in the cross-referenced application designated M. Benveniste-5, which describes application of channel borrowing (dynamic) to address changing capacity requirements in cells having non-regular channel allocations periodically re-determined (adaptive) by an optimum non-regular channel allocation methodology.

The ADCA algorithm which constitutes a preferred channel assignment method for the self configurability methodology of the invention is disclosed in detail in the cross-referenced application designated M. Benveniste-6. As shown in that referenced application, that ADCA algorithm can be described in terms of three basic functions: a Channel Acquisition Function, a Channel Release Function, and a Channel (Re-)Allocation Function. The Channel Acquisition Function is invoked when a call is started or handed off. The Channel Release Function is needed only if the algorithm permits channel re-arrangements. It is invoked whenever a call served by a channel allocated to the cell terminates or is handed off, thereby permitting the release of a "borrowed" non-allocated channel, with the call thereon being transferred to the newly empty allocated channel. The Channel (Re-)Allocation Function finds the way channels should be allocated in the system so that the number of channels allocated to each cell or sector meets a chosen criteria. For example, the number of allocated channels is proportional to the number of channels needed, and their ratio is maximum. The function is invoked when the channel allocation must be (re)computed.

All functions employ the serving signal and interference statistics. These statistics are estimated from data collected by the system. Other information needed by the first two functions is the allocation status of channels for each cell, which is supplied by the third function.

III. Criterion for Admissibility of a Channel Assignment

In most of the existing dynamic channel assignment algorithms, admissibility of a new call on a channel is determined by checking whether the channel is in use in any one of a specified list of neighbor cells. The list of interfering candidates is constructed by various methods, based either on real-time or a priori measurements, or on analytical modeling.

In some cases, the check of permissibility of co-channel use for a pair of cells/sectors is facilitated by the construction of a compatibility matrix, a square matrix of dimension equal to the number of cells/sectors in the wireless communications network. The elements of the matrix are either 1 or 0, indicating respectively whether or not a pair of cell/sectors can use the same channel simultaneously. Alternatively, when a graph-coloring approach to channel assignment is taken, a graph is constructed with nodes corresponding to the cells/sectors in the system, and edges connecting nodes corresponding to cells/sectors that cannot use the same channel at once.

Figure 2:
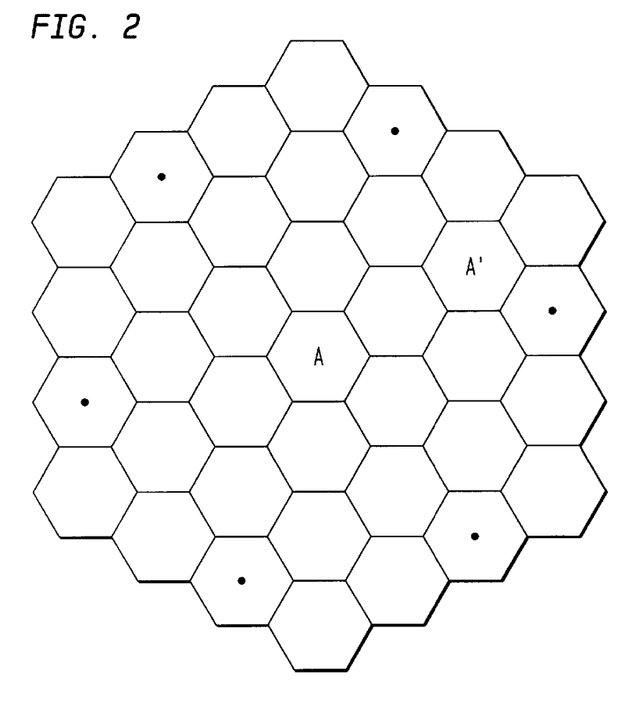
FIG. 2 is cell area schematic addressed to channel assignment admissibility.

With either representation, the existing algorithms rely on pairwise permissions to come up with a collection of cells/sectors that may use the same channel simultaneously. Since these permissions are derived without any information on other cells/sectors, they become more stringent than necessary. The result is suboptimal, as a number of feasible combinations of co-channel users may be excluded. Consider for instance the example of cells A and A' in FIG. 2. If one were to derive pairwise permissions for the simultaneous use of a channel based on the assumptions and criteria employed in adopting a re-use factor N=7 (that is, it is assumed that there are six other co-channel users at the same distance as the pair in question as indicated by the dots in FIG. 2), these two cells would be denied permission to use the same channel. In a situation, however, whereby there exist no other cells in the neighborhood using the same channel, co-channel use by cells A and A' is allowable.

Accordingly, a new test for admissibility of a new channel assignment is disclosed herein wherein channel use is considered in all cells/sectors in the interference neighborhood of the cell/sector in question. An example (which appears in the cross-referenced applications designated Benveniste-5 and Benveniste-6) illustrates this approach.

Consider that it is desirable to check where a given channel can be used simultaneously by a collection of cells/sectors C. The criterion can be written as follows:

$$\text{Prob}\left[\frac{S_j}{\sum_{i \neq j, \varepsilon C} I_{ij}} \geq T\right] \geq 1 - \alpha \text{ for } j \varepsilon C \quad \text{(III-1)}$$

To write the above as an equivalent deterministic inequality, we need to know the probability distribution of the signal-to-interference ratio. Let Y be the value of this ratio, expressed in decibels. That is, $$Y = 10 \log_{10}\left[\frac{S_j}{\sum_{i \neq j, \varepsilon C} I_{ij}}\right] \quad \text{(III-2)}$$

Following other treatments, we assume that Y is normally distributed. Let $\mu_Y$ and $\sigma_Y^2$ be the mean and variance of Y, respectively, and let R be the signal-to-interference ratio threshold value T expressed in decibels. Equation (III-1) can be written as follows:

$$\text{Prob}[Y \geq R] = 1 - \text{Prob}\left[z \leq \frac{R - \mu_Y}{\sigma_Y}\right] \geq 1 - \alpha \quad \text{(III-3)}$$

for $j \varepsilon C$ where z is a normal random variable. The equivalent deterministic constraint is the following:

$$\mu_Y + z_\alpha \sigma_Y \geq R \quad \text{(III-4)}$$

where $z_\alpha$ is the $\alpha$-quantile of a normal random variable.

The values of $\mu_Y$ and $\sigma_Y$ depend on the composition of set C. In this example, they are computed using the assumption that the signals of all antenna faces, when expressed in decibels, are independent normally distributed random variables and that the cumulative interference experienced in cell j is also normally distributed, when expressed in decibels. Let $$Y = P - L \quad \text{(III-5)}$$

where $$L = 10 \log_{10}\left[\sum_{i \neq j, \varepsilon C} I_{ij}\right]$$

$$P = 10 \log_{10} S_j \quad \text{(III-7)}$$

If $\mu_L$ is the mean of the cumulative interference L in cell j, expressed in decibels, $\sigma_L^2$ is the variance of L, $\mu_P$ is the mean of the power signal P in cell j, expressed in decibels and $\sigma_P^2$ is the variance of P, then the mean and variance of Y are given by:

$$\mu_Y = E(Y) = E(P) - E(L) = \mu_P - \mu_L \quad \text{(III-8)}$$

$$\sigma_Y^2 Var(Y) = Var(P) + Var(L) - 2cov(P,L) = \sigma_P^2 + \sigma_L^2 - 2cov(P,L) \quad \text{(III-9)}$$

$\mu_P$ and $\sigma_P^2$ may be calculated from analytical models, or estimated based on empirical data, which may accumulate during the operation of the system, as illustrated in Section C below. $\mu_L$, $\sigma_L^2$, and cov(P,L), which vary with the composition of the set C, are computed in each step of the Subprogram Solution algorithm by a power-summing procedure. The statistical parameters employed in the power summing computation may be calculated from analytical models, or estimated based on empirical data that may accumulate during the operation of the system.

Alternative tests may be derived in a similar way employing the bit-error-rate as the measure of quality for a wireless connection.

IV. Description of Self-Configurable Wireless System

A self-configurable wireless system according to the invention may be implemented without modification of the wireless system architecture. Instead, such implementation is carried out through a combination of software additions, modifications to existing software, and the addition of radios at the cell sites to provide signal strength and interference measurements. By thus building onto the existing system architecture, the present functionality that architecture is preserved, and accordingly a system incorporating the self configurability methodology retains the capability to switch between the present and the self-configurable modes of operation, if such a switch becomes necessary or desirable. In order to develop a proper understanding of the modifications to a wireless system contemplated by the invention, an illustrative example of an existing wireless system is first briefly described.

A. Present System Configuration

Figure 3:
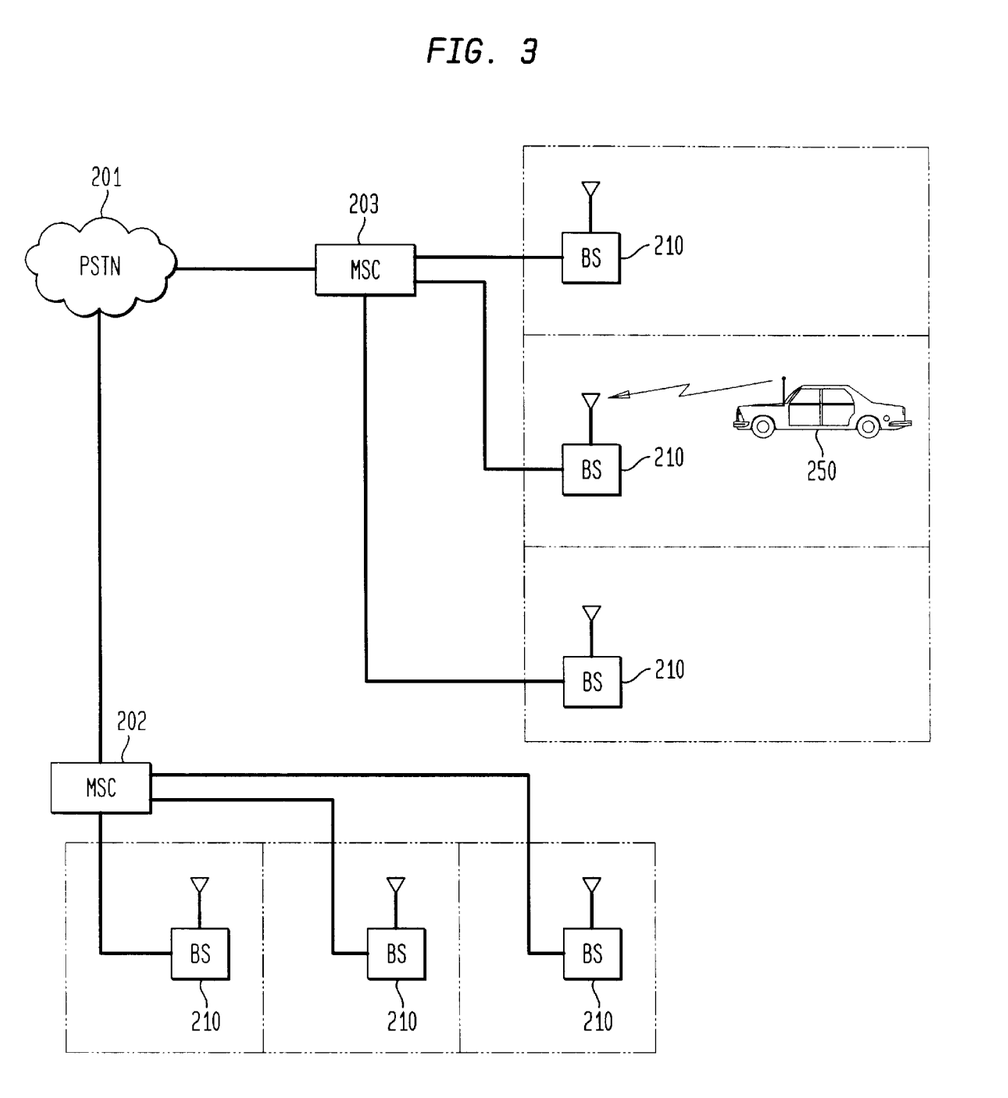
FIG. 3 is a block schematic of a wireless/cellular radiotelephone system.

A typical cellular system is shown in the block diagram of FIG. 3. A plurality of mobile switching centers (MSC), 202 and 203, are shown connecting the mobile radiotelephone system to the public switched telephone network 201 (PSTN). The switching of the MSCs interconnects a plurality of base stations (BS) 210 each providing service to a cell coverage area. Each coverage area is shown as having irregular boundaries typical of an actual system. Each BS has radio transmit/receive equipment and radiating antennas to serve mobile radiotelephones 250 within its cell coverage area.

Figure 4:
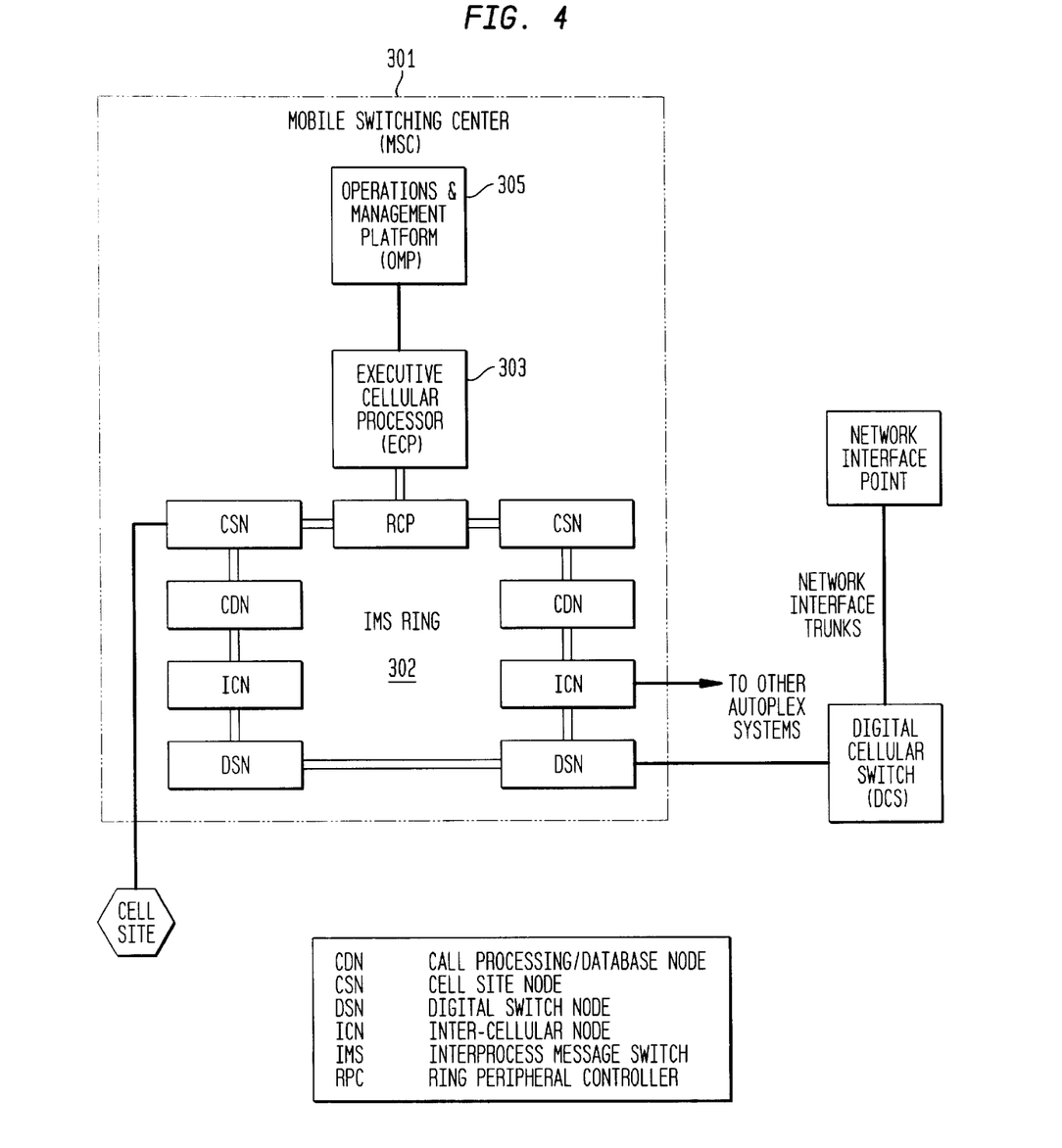
FIG. 4 is a block schematic of a mobile switching center for a wireless/cellular radiotelephone system.

In FIG. 4, the major functional elements of a Mobile Switching Center are illustrated. As will be seen in that figure, control of the call processing and channel assignment process resides in the MSC 301, which houses several processors linked to an Interprocess Message Switch (IMS) 302, in a token ring architecture. Channel assignment is performed by the Executive Cellular Processor (ECP) 303, in the Voice Channel Administration (VCA) module. Both fixed channel assignment and a simple dynamic channel assignment algorithm are typically available in the present VCA module.

Upon initialization of the system, VCA reads from a database the channel assignments that have been specified for all cells/sectors. VCA keeps a record of the voice channels available to a cell/sector and of their busy/idle status during system operation. When service is requested, an idle channel is selected, following one of the available "trunk hunt" algorithms. If the Dynamic Channel Assignment (DCA) option is employed, VCA marks the channels that are accessible by the DCA algorithm, and keeps track of the DCA-enabled/disabled status of a channel—i.e., whether a DCA channel is busy in an interfering neighbor cell. When a DCA channel is selected, it is marked DCA-disabled in the neighbor cells.

The ECP is also responsible for OA&M functions, which include the collection of service measurements. For instance, the number of offered calls, call handoff requests, blocked calls, and dropped calls are tallied by the cell sites, and are periodically uploaded to the ECP. A faster processor, the Operations and Management Platform (OMP) 305, adjunct to the ECP, assists the ECP with the OA&M functions. The OMP is fully responsible for the collection of service measurements.

B. Self-Configurable System Configuration

Figure 5:
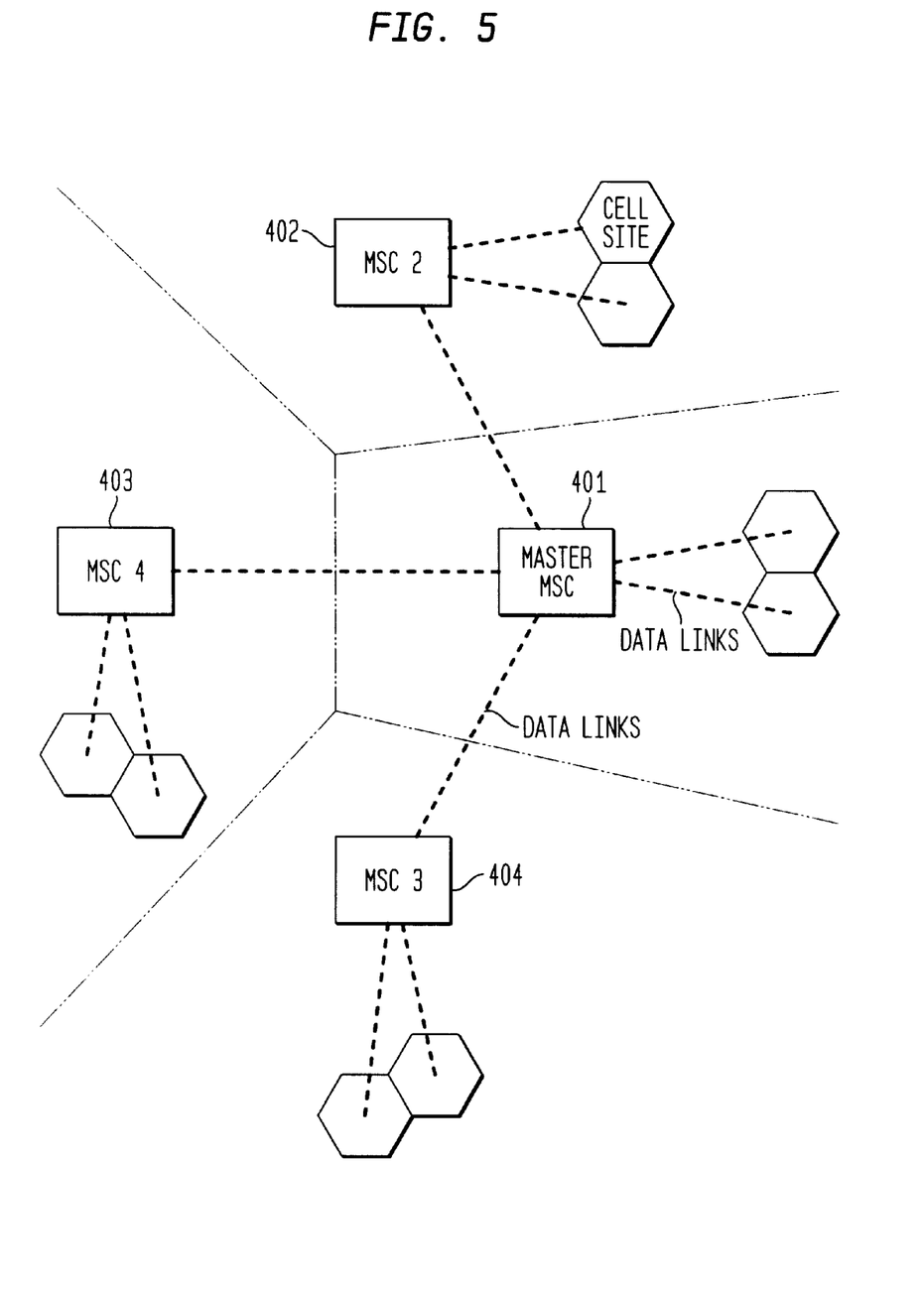
FIG. 5 illustrates a plurality of mobile switching centers configured according to the method of the invention.

For the self-configurable wireless system of the invention, channel assignment will, in a preferred embodiment, remain centrally controlled. [Note however, that, as an alternative embodiment, channel assignment for the method of the invention may be implemented as a distributed, rather than centralized algorithm. Such a distributed algorithm would have all base stations exchange information in a centrally coordinated manner.] In a multi-MSC system, such as depicted in FIG. 5, the channel assignment function will be implemented in a two-level hierarchical architecture. As illustrated in the figure, an MSC, designated the Master MSC 401, will operate to compute the channel allocation for the entire system. The remaining functions—e.g., traffic load, serving signal and interference statistics estimation— will be controlled by the serving MSCs 402, 403 & 404 (including also the Master MSC as to its own service area).

Figure 6:
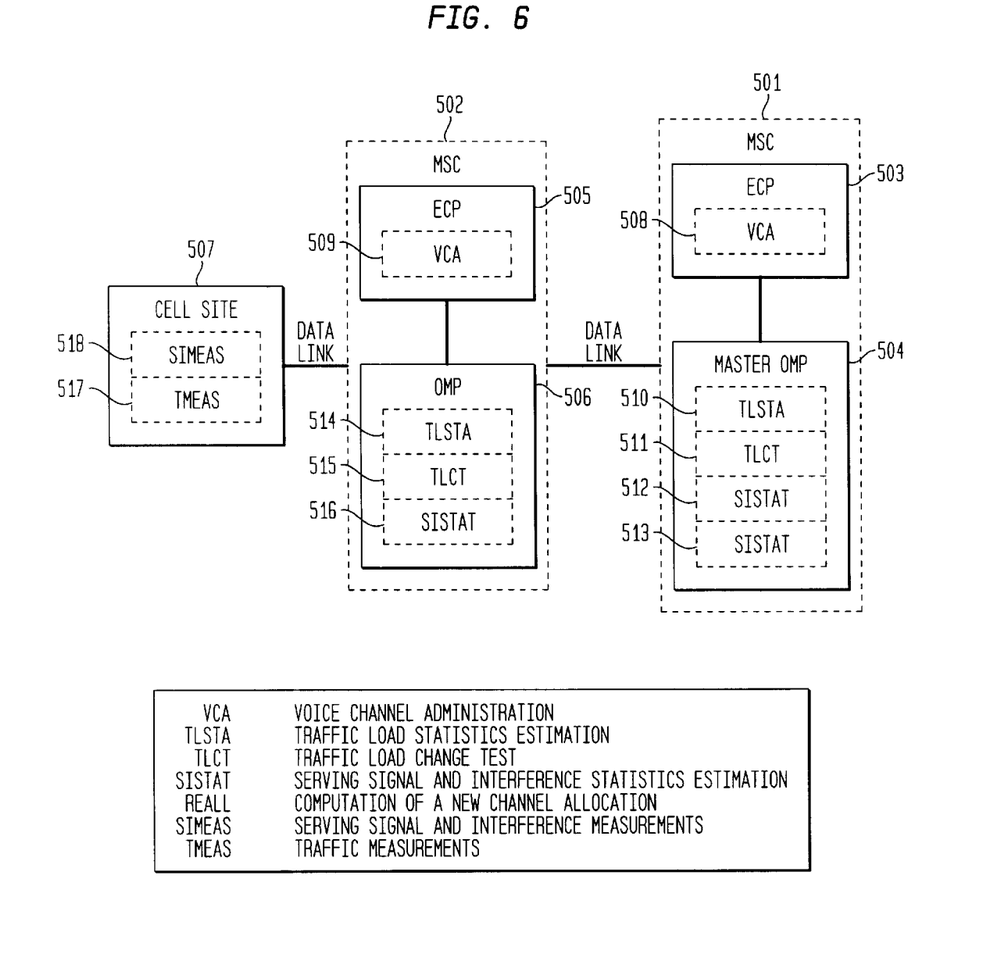
FIG. 6 provides a functional depiction of a master and a serving mobile switching center according to the invention.
Figure 7:
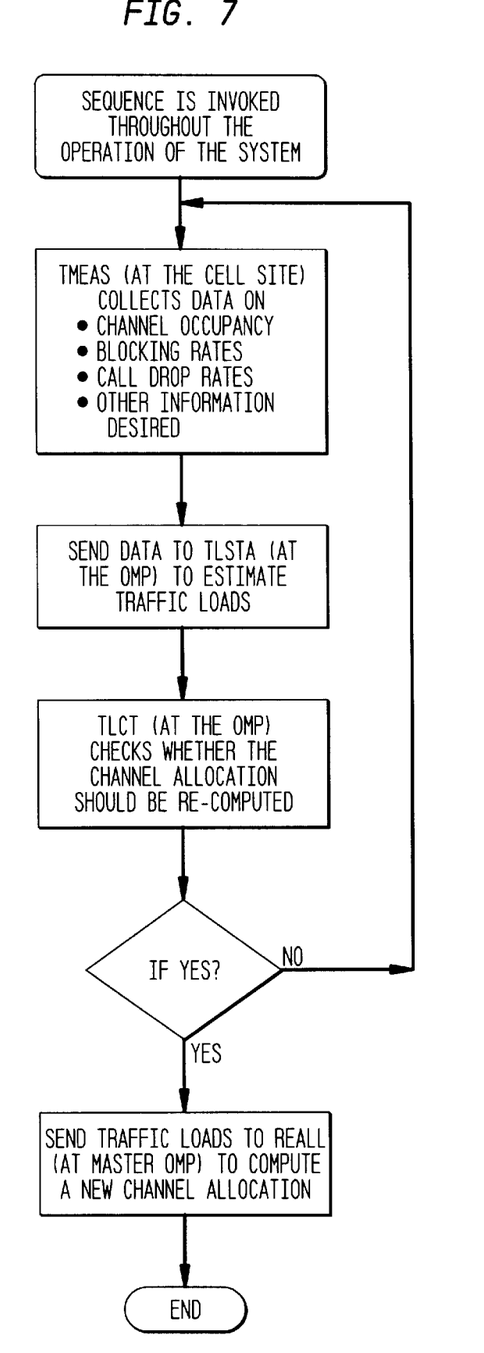
FIG. 7 is a flow process diagram of a traffic data collections method as implemented in the invention.
Figure 8:
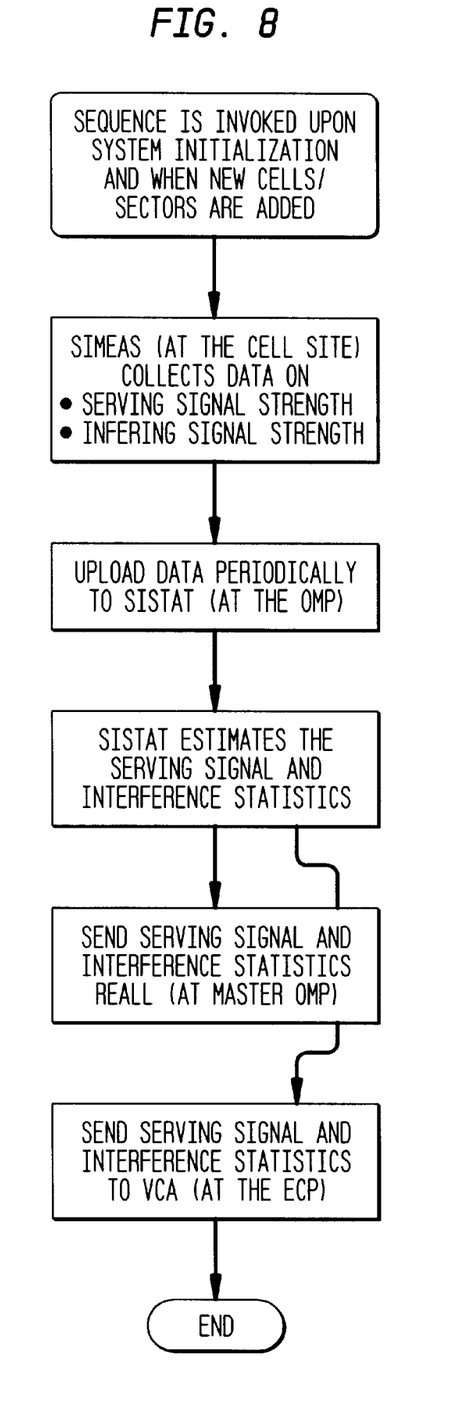
FIG. 8 is a flow process diagram of a serving signal and interference data collection method as implemented in the invention.
Figure 9:
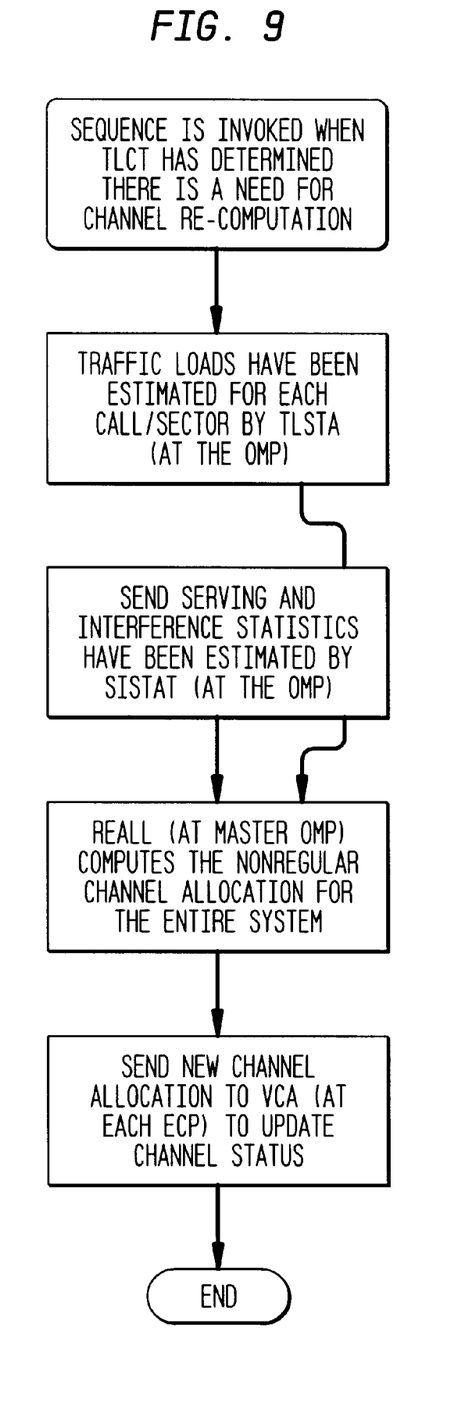
FIG. 9 is a flow process diagram of a channel (re) allocation method as implemented in the invention.

The functional relationships between the master MSC, a serving MSC and a cell site are illustrated in FIG. 6. Within an MSC, responsibility for the new functions implemented in accordance with the invention will be shared by the ECP and the OMP, and new data gathering functions are carried out by the cell sites. The functions of the inventive methodology, and their inter-relationship are described in the sub-sections following, and are depicted in flow diagram form in FIGS. 7–9.

(1) The ECP

In the ECP, VCA will operate as presently, with modifications and additional features as described herein. A basic change is the elimination of a one-to-one correspondence between radios and voice channels. Each cell/sector will have access to more channels than the number of radios at the cell site. When a channel-radio request is received, VCA will select both, a voice channel and a radio, and will instruct the cell site to tune the selected radio to the selected channel. The radio selection procedure remains unchanged, but voice channel selection by the VCA is modified in the system of the invention.

VCA will keep a list of the channels accessible by a cell/sector, as done presently, and will keep track of the channel allocation status—that is, whether a channel is allocated or non-allocated to a cell. This information will be supplied by the OMP and will be updated every time a new channel allocation is computed. That channel (re)allocation process is shown in the flow diagram of FIG. 9. All channels accessible by a cell will be marked as DCA channels. Channel selection and release will follow the logic of the Channel Acquisition and Channel Release Functions, described in the introductory section above, and more particularly in the cross-referenced application designated M. Benveniste-6.

In order to determine whether an acceptable S/I ratio, or BER, will be maintained for a given channel assignment, VCA will keep track of the total interference experienced on each channel at each cell. This quantity will be updated as channels are acquired or released, and will be computed using the relevant statistical parameters. The statistical parameters needed for the estimation of the S/I ratio or BER will be supplied by the OMP, and recorded by VCA for each cell/sector. These parameters will change only when there are system configuration changes or new cells/sectors are added. The process of determining serving signal and interference statistics is shown in the flow diagram of FIG. 8.

If channel re-arrangements are permitted, VCA will also maintain a counter of the number of re-arrangements performed on each call. In an alternative embodiment, VCA will include a timer for maintaining a record of the time interval since the last channel re-arrangement on each call so that minimum spacing is maintained.

(2) The OMP

As illustrated in FIG. 6, the OMP 506 will collect serving signal and interference measurements from the Serving Signal and Interference Measurements (SIMEAS) module 518 at a cell site 507, for the estimation of their statistical distribution parameters (i.e. mean, variance, and covariance) in the Serving Signal and Interference Statistics Estimation (SISTAT) module. These parameters are needed both by VCA, and for the calculation of a channel allocation. The serving signal and interference statistics are first computed at the time of a new system installation. Those statistics are then re-computed whenever there are system configuration changes or additions of new cells/sectors.

The OMP will also collect traffic data from the Traffic Measurements (TMEAS) module 517 at a cell site 507, and will estimate the offered loads in the Traffic Load Statistics Estimation (TLSTA) module 514. These estimates will be used by the Traffic Load Change Test (TLCT) module 515 to determine whether the traffic pattern has changed sufficiently to necessitate re-allocation of the channel. The process of determining such traffic load statistics and determining whether a new channel allocation should be computed is shown in the flow diagram of FIG. 7.

Finally, the Master OMP 504 determines the allocation of channels to cells, in the Computation of New Channel Allocation (REALL) module 513. In a preferred embodiment of the invention, this module carries out the adaptive-dynamic channel allocation algorithm described hereinbefore, and more particularly in the cross-referenced application designated M. Benveniste-6.

In a multi-MSC system, it is desirable to compute channel allocations for all MSCs together in order to obtain best results. Since efficient algorithms exist for large systems [see, M. Benveniste, "An Optimization Model for Non-Regular Assignment in Wireless Communications Networks", *AT&T Bell Laboratories Technical Memorandum* 54452-920601-01*TM*, Jun. 1, 1992], it is possible to have a single OMP, the Master OMP, receive traffic, serving signal, and interference statistics from the other OMPs, and calculate the optimal channel allocation for the entire system.

(3) The Cell Sites

The self-configurable wireless system will utilize an existing function of the cell site, measurement of serving signals, in conjunction with a new function implemented at the cell site, collection of interference measurements. Each cell site will be equipped with special analog Locate Radios or Enhanced Digital Radio Units (EDRUs) capable of digital color code verification, to measure the strength of signals from individual mobiles in nearby cells. The SIMEAS module in the cell will collect serving and interfering signal measurements, needed by the SISTAT module in the OMP, in order to estimate the statistical distribution parameters to be used by the REALL module in the Master OMP, and VCA in the ECP.

The cell sites presently collect service measurements which are uploaded to the ECP on an hourly basis. In the system of the invention, these measurements will be converted in the Traffic Measurement (TMEAS) module 517 into traffic-related data, such as channel utilization, blocking rates, and call-drop rates, which will be used by the TLSTA module at the OMP to estimate offered loads for each cell/sector. Offered load estimates will also be used to calculate channel allocations by the REALL module at the Master OMP.

C. Statistical Parameter Estimation

The admissibility of a given channel assignment requires knowledge of the serving and interfering signals at a mobile and base station receiver, regardless of whether the admissibility criterion is posed as a deterministic or probabilistic statement. In the method of the invention, the necessary parameters are derived from measurements performed at the base station during, and without interfering with, the normal operation of the system. These are not real-time measurements of the serving and interfering signals for the call(s) for which feasibility of co-channel use is checked. These measurements serve as a sample, of a larger population, to be used for parameter estimation. Hence, they may be collected selectively, and once a sufficient sample size has been collected, signal strength measurement may cease, to be resumed again only when new cells/sectors are added or when system configuration parameters are modified. Only a subset of parameters, near the immediate neighborhood of the system change, need to be re-estimated since system changes have only a local impact.

Section III above provides an example of a test for admissibility of a candidate channel assignment. In the preceding section the configuration of a wireless system capable of collecting serving and interfering signal measurements during normal operation was described. In this section, it is shown how the needed statistical parameters can be estimated from collected signal strength measurements.

Consider, as an illustrative example, that the parameters desired to be estimated are:

$\mu_j$ mean of the serving signal in logical cell j $\sigma_j^2$ variance of serving signal in logical cell j $\mu_{ij}$ mean of the interfering signal from logical cell i to logical cell j $\sigma_{ij}^2$ variance of the interfering signal from logical cell i to logical cell j $Cov_{ikj}$ covariance of the interfering signals from logical cells i and k to logical cell j Signals measured on either the uplink (from the mobile to the base station) or the downlink (from the base station to the mobile) can be used for parameter estimation in both directions, provided the proper power scaling has been applied in order to normalize the signal. In the discussion following, it is assumed for simplicity and without loss of generality that all signals are measured on the up link, in decibels, and have been normalized. It is further assumed that the following signals are available for the estimation of the above listed parameters. Denote the nth individual measurement of the signal received from a mobile served by cell j as $DS_j^{(n)}$, n=1, ..., N, and the signal received by cell j from mobiles served by cell i as $DI_{ij}^{(n)}$, n=1, ..., N. Then the following formulas can be used to estimate the uplink parameters discussed above.

$$\mu_j = \frac{1}{N}\sum_{n=1}^{N} DS_j^{(n)}$$

$$\sigma_i^2 = \frac{1}{N-1}\left(\sum_{n=1}^{N} DS_j^{(n)2} - N\mu_j^2\right)$$

$$\mu_{ij} = \frac{1}{N}\sum_{n=1}^{N} DI_{ij}^{(n)}$$

$$\sigma_{ij}^2 = \frac{1}{N-1}\left(\sum_{n=1}^{N} DI_{ij}^{(n)2} - N\mu_{ij}^2\right)$$

$$cov_{ikj}^2 = \frac{1}{N-1}\left(\sum_{n=1}^{N} DI_{ij}^{(n)}DI_{kj}^{(n)} - N\mu_{ij}\mu_{kj}\right)$$

The same formulas apply to downlink parameters provided one uses downlink measurements. When using uplink measurements, it is sufficient to note the relationship between the uplink and downlink signals. If the uplink and downlink measurements of a signal q are denoted as u(q) and d(q), respectively, then the following relationships hold:

$u(DS_j)=d(DS_j)$ $u(DI_{ij})=d(DI_{ji})$

Computational Considerations

The following relationships can be used as shortcuts, in order to avoid recomputation of some of the parameters:

$u(\mu_j)=d(\mu_j)$ $u(\sigma_j^2)=d(\sigma_j^2)$ $u(\mu_{ij})=d(\mu_{ji})$ $u(\sigma_{ij}^2)=d(\sigma_{ji}^2)$ There is no simple relationship between downlink and uplink covariance of the signals of two logical cells interfering with a third. Both need to be computed.

The estimation of the necessary statistical parameters does not require the retention in memory of all the sample data. Retention of the following statistics is sufficient:

$$\sum_{n=1}^{N} DS_j^{(n)}$$

$$\sum_{n=1}^{N} DS_j^{(n)2}$$

$$\sum_{n=1}^{N} DI_{ij}^{(n)}$$

$$\sum_{n=1}^{N} DI_{ij}^{(n)2}$$

$$\sum_{n=1}^{N} DI_{ij}^{(n)} DI_{kj}^{(n)}$$

Hence, upon completion of a new measurement a simple multiplication and/or addition is performed to update the relevant statistics above. The measurement can then be discarded.

Finally, interference parameters need not be estimated for all possible combinations of cells. These parameters will be estimated only for the cells within the interference neighborhood of each cell.

D. System Initialization Conditions

A self-configurable wireless system according to the invention will perform its own channel assignment and collect the needed data during normal operation. But, until the system is up and running, there is no data available with which to get started. A simple set of input data will be adequate for that purpose. That data consists of the pairs of cells/sectors that may not use the same channel concurrently.

As described above, VCA needs the following data: the allocation status of channels in each cell, and the serving signal and interference statistics needed to determine whether the Channel S/I or BER meets a specified requirement before selecting channels. The allocation status of channels, though necessary to efficient operation of the system, is not necessary for the execution of VCA and, hence, it can be omitted at system start-up. All channels will thus be initially given "non-allocated" status. As the system runs, it will accumulate the data needed for the computation of a channel allocation.

The channel S/I or BER determination, on the other hand, requires data in respect to the serving signal and interference statistics, which data are not available until the system has been running for a while. Knowledge of the pairs of cells/sectors that may not use the same channel concurrently, however, is sufficient to ensure compliance with the S/I or BER requirements and adequate to get the system going. Improved data will accumulate with system operation. The required initialization data can be supplied by the operator. Alternatively this data can be collected autonomously by a system whose base station radios are able to receive signals from other base stations.

E. Channel Allocation Algorithm

In a preferred embodiment of the invention, the channel allocation algorithm implemented by the method of the invention will be selected from the class of adaptive-dynamic channel allocation algorithms, as described above, and more fully explained in the cross-referenced application designated M. Benveniste-6. That ADCA algorithm achieves the following goals: it performs consistently better than regular fixed channel assignment, and it adapts fully to traffic variation. Hence, it minimizes the number of cell sites needed to meet a traffic load with variable distribution.

Recognizing that channel re-arrangements should be used sparingly, ADCA is able to implement such channel re-arrangements, but does not rely on them. [For a discussion of channel re-arrangement considerations, see the cross-referenced application designated Benveniste-6.] Moreover, the algorithm employs other mechanisms to achieve its goals. The non-regular channel assignment used to allocate channels to cells coupled with the priority given to the "allocated" channels place channels where the calls are most likely to be. Channel borrowing fine-tunes the deployment of channels by correcting for any deviations that may exist between the projected and the realized traffic distributions.

The channel re-allocation step is important to the algorithm's performance and, preferably will not be by-passed. It helps maximize capacity by placing channels where the calls are likely to be and, thus, achieves the shortest realized re-use distance possible. The realized re-use distance is the distance between active calls on the same channel.

It should be understood, however, that, while the operation of the ADCA algorithm with the self configurability method of the invention provides a number of desirable features, many other channel allocation algorithms may be used with the invention. For example, if, instead of a non-regular, a regular channel allocation were used (as in simple borrowing [see, e.g., L. G. Anderson,"A Simulation Study of Some Dynamic Channel Assignment Algorithms in a High Capacity Mobile Telecommunications System", *IEE Trans. Commun.*, Vol. 21, No. 11, November 1973; J. S. Engel and M. M. Peritsky, "Statistically-Optimum Dynamic Server Assignment in Systems with Interfering Servers", *IEEE Trans. Commun.*, Vol. 21, No. 11, November 1973]), the capacity would be lower because the realized re-use distance would exceed the planned re-use distance. The planned re-use distance is the distance between cells allocated the same channel. While regular channel allocation has the property that it minimizes the planned re-use distance, it achieves a minimum realized re-use distance only if traffic is uniformly distributed. Otherwise, a greater re-use distance would be realized.

V. Conclusion

Herein has been described a novel system and method for the self configurability of a wireless communications system. Thus, channel assignment need no longer be an activity that must precede the installation of a new system or its expansion. Implementation of such systems is entirely within the capabilities of current technology and air-interface standards. The existing wireless system architecture can be preserved in a way that will make it possible to switch, if necessary, between the present "manual", and a self-configurable mode of operation. Although the present embodiment of the invention has been described in detail, it should be understood that various changes, alterations and substitutions can be made therein without departing from the spirit and scope of the invention as defined by the appended claims. In particular, it should be noted that while the described embodiments of the invention have generally been characterized in terms of frequency assignments in analog systems, it is to be understood that the same techniques may be applied to code assignments in CDMA systems and time slot assignments in TDMA systems, as well as to GSM systems. They will also be applicable to hybrids of two or more of such systems. It should be understood as well that the methodology of the invention will also be applicable to micro-cellular systems, including intra-building systems.

I claim:

1. In a wireless communications system having service areas partitioned into a plurality of cells, wherein a set of communications channels are available for allocation among said cells, an improvement in said system comprising:

means for autonomously collecting traffic demand and interference data for at least a portion of said channels available for allocation during normal operation of said system; and means for automatically allocating channels among said cells as a function of said traffic demand and interference data.

2. The improved wireless communications system of claim 1 further including a means for determining admissibility of a channel assignment.

3. The improved wireless communications system of claim 2 wherein said means for determining admissibility operates to cause a determination of admissibility for a candidate channel assignment to be made in respect to a consideration of a collective impact of all co-channel users in a relevant neighborhood.

4. The improved wireless communications system of claim 2, wherein said means for determining admissibility operates by considering estimates of serving and interfering signals from all active calls on a channel under consideration.

5. The improved wireless communications system of claim 1 wherein said data collected by said autonomous data collection means includes serving signal and interference measurement data.

6. The improved wireless communications system of claim 5 wherein said serving signal and interference data provides a basis for estimation of parameters employed in determining admissibility of a candidate channel assignment.

7. The improved wireless communications system of claim 1 wherein said data collected by said autonomous data collection means includes traffic load data.

8. The improved wireless communications system of claim 1 wherein said automatic channel allocation applies a channel assignment algorithm of the class known as adaptive-dynamic channel assignment ("ADCA") algorithms.

9. The improved wireless communications system of claim 8 wherein said ADCA algorithm operates to implement a channel rearrangement within a cell upon vacation of a channel allocated to said cell.

10. The improved wireless communications system of claim 8 wherein said ADCA algorithm operates to implement a channel re-allocation in response to changes in said data collected by said autonomous data collection means.

11. In a wireless communications system having service areas partitioned into a plurality of cells, wherein a set of communications channels is available for allocation among said cells, a method for allocating said channels to said cells on a substantially automated basis comprising the steps of:

providing an initial allocation of said channels among said cells;

autonomously collecting serving signal and interference data during normal operation of said communications system, for at least a portion of said channels initially allocated among said cells;

processing said collected serving signal and interference data to form statistical estimates of serving signal strength and interference signal strength said statistical estimates being functionally related to a methodology for allocation of said channels among said cells;

reallocating channels among said cells based on application of said statistical estimates in said channel allocation methodology;

periodically repeating said collecting and said processing steps; and upon a current set of said statistical estimates being found to deviate from a next-preceding set of said statistical estimates by a predetermined criterion, carrying out said reallocating step based on said current set of said statistical estimates.

12. The method for allocating channels to cells of claim 11 further including a step of determining admissibility of a channel assignment.

13. The method for allocating channels to cells of claim 12 wherein said step of determining admissibility of a channel assignment operates to cause a determination of admissibility for a candidate channel assignment to be made in respect to a consideration of a collective impact of all co-channel users in a relevant geographic vicinity.

14. The method for allocating channels to cells of claim 12 wherein said step of determining admissibility of a channel assignment operates by considering estimates of serving and interfering signals from all active calls on a channel under consideration.

15. The method for allocating channels to cells of claim 12 wherein said serving signal and interference data determined in said collecting step provide a basis for estimation of parameters employed in determining admissibility of a candidate channel assignment.

16. The method for allocating channels to cells of claim 11 wherein said data collected in said collecting step includes traffic load data.

17. The method for allocating channels to cells of claim 11 wherein application of said method is transparent to an architecture of said communications system, thereby permitting operation of said system in either an automatic channel assignment mode according to said method or in a manual channel assignment mode.

18. The method for allocating channels to cells of claim 11 wherein application of said method is controlled from a centralized processor in an architecture of said communications system.

19. The method for allocating channels to cells of claim 11 wherein said selected channel assignment algorithm is of the class known as adaptive-dynamic channel assignment ("ADCA") algorithms.

20. The method for allocating channels to cells of claim 19 wherein said ADCA algorithm operates to implement a channel re-arrangement within a cell upon vacation of a channel allocated to said cell.

21. The method for allocating channels to cells of claim 19 wherein said ADCA algorithm operates to implement a channel re-allocation in response to changes in said data collected by said collecting step.

* * * * *

UNITED STATES PATENT AND TRADEMARK OFFICE
CERTIFICATE OF CORRECTION

PATENT NO. : 6,112,092
DATED : August 29, 2000
INVENTOR(S) : Mathilde Benveniste It is certified that error appears in the above-identified patent and that said Letters Patent is hereby corrected as shown below:

Column 15,
Lines 6-16, claim 1 should read:

--      1.      In a wireless communications system having service areas partitioned into a plurality of cells, wherein a set of communications channels are available for allocation among said cells, a channel allocation system for allocating said channels to said cells on a substantially automated basis comprising:
        means for autonomously collecting traffic demand, serving signal and interference data at a cell site, during normal operation of said system, for at least a portion of said channels available for allocation;
        means for processing said collected serving signal and interference data to form statistical estimates of signal-to-interference parameters for cells of said system;
        means for processing said collected traffic demand data to form statistical estimates of system loading, and operating on said loading estimates to evaluate a need for reallocation of said channels among said cells;
        means for making an allocation of channels among said cells as a function of said loading estimates and said signal-to-interference parameters, and in response to a determination by said traffic-demand-data processing means of a need for channel reallocation. --

Column 15, lines 56-64 and Column 16, lines 1-18
Claim 11 should read:

--      11.     In a wireless communications system having service areas partitioned into a plurality of cells, wherein a set of communications channels is available for allocation among said cells, a method for allocating said channels to said cells on a substantially automated basis comprising the steps of:
        providing an initial allocation of said channels among said cells;
        autonomously collecting traffic demand, serving signal and interference data at a cell site, during normal operation of said communications system, for at least a portion of said channels initially allocated among said cells;
        processing said collected serving signal and interference data to form statistical estimates of signal-to-interference parameters for cells of said system;

UNITED STATES PATENT AND TRADEMARK OFFICE
CERTIFICATE OF CORRECTION

PATENT NO.    : 6,112,092
DATED         : August 29, 2000
INVENTOR(S)   : Mathilde Benveniste It is certified that error appears in the above-identified patent and that said Letters Patent is hereby corrected as shown below:

processing said collected traffic demand data to form statistical estimates of system loading, and operating on said loading estimates to evaluate a need for reallocation of said channels among said cells;
      in response to a determination in said traffic-demand-data processing step of a need for channel reallocation, reallocating channels among said cells based on application of said loading estimates and said signal-to-interference parameters; and
      periodically repeating said collecting step and one or more of said processing steps. --

Signed and Sealed this

Twenty-fifth Day of June, 2002

*Attest:*

JAMES E. ROGAN
*Director of the United States Patent and Trademark Office*

*Attesting Officer*